United States Patent
Frolikov et al.

(10) Patent No.: US 10,852,949 B2
(45) Date of Patent: Dec. 1, 2020

(54) PREDICTIVE DATA PRE-FETCHING IN A DATA STORAGE DEVICE

(71) Applicant: Micron Technology, Inc., Boise, ID (US)

(72) Inventors: Alex Frolikov, San Jose, CA (US); Zachary Andrew Pete Vogel, San Jose, CA (US); Joe Gil Mendes, Santa Cruz, CA (US); Chandra Mouli Guda, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 28 days.

(21) Appl. No.: 16/384,618

(22) Filed: Apr. 15, 2019

(65) Prior Publication Data

US 2020/0326851 A1 Oct. 15, 2020

(51) Int. Cl.
- *G06F 3/06* (2006.01)
- *G06F 12/08* (2016.01)
- *G06F 12/0862* (2016.01)
- *G06N 20/00* (2019.01)

(52) U.S. Cl.
CPC ............ *G06F 3/061* (2013.01); *G06F 3/0659* (2013.01); *G06F 3/0673* (2013.01); *G06F 12/0862* (2013.01); *G06N 20/00* (2019.01)

(58) Field of Classification Search
None
See application file for complete search history.

(56) References Cited

U.S. PATENT DOCUMENTS

| | | |
|---|---|---|
| 5,390,334 A | 2/1995 | Harrison |
| 5,727,150 A | 3/1998 | Laudon et al. |
| 5,909,540 A | 6/1999 | Carter et al. |
| 5,918,229 A | 6/1999 | Davis et al. |
| 6,026,475 A | 2/2000 | Woodman |
| 6,230,260 B1 | 5/2001 | Luick |
| 6,247,097 B1 | 6/2001 | Sinharoy |

(Continued)

FOREIGN PATENT DOCUMENTS

KR 20160116533 A 10/2016

OTHER PUBLICATIONS

International Search Report and Written Opinion, PCT/US2019/015602, dated May 3, 2019.

(Continued)

*Primary Examiner* — Charles Rones
*Assistant Examiner* — Han V Doan
(74) *Attorney, Agent, or Firm* — Greenberg Traurig

(57) ABSTRACT

A data storage system having non-volatile media, a buffer memory, a processing device, and a data pre-fetcher. The data pre-fetcher receives commands to be executed in the data storage system, provides the commands as input to a predictive model, obtains at least one command identified for pre-fetching, as output from the predictive model having the commands as input. Prior to the command being executed in the data storage device, the data pre-fetcher retrieves, from the non-volatile memory, at least a portion of data to be used in execution of the command; and stores the portion of data in the buffer memory. The retrieving and storing the portion of the data can be performed concurrently with the execution of many commands before the execution of the command, to reduce the latency impact of the command on other commands that are executed concurrently with the execution of the command.

20 Claims, 5 Drawing Sheets

(56) References Cited

U.S. PATENT DOCUMENTS

| | | |
|---|---|---|
| 6,279,138 B1 | 8/2001 | Jadav et al. |
| 6,473,845 B1 | 10/2002 | Hornung et al. |
| 7,376,681 B1 | 5/2008 | Todd et al. |
| 8,082,400 B1 | 12/2011 | Chang et al. |
| 8,117,373 B2 | 2/2012 | Berlin |
| 8,131,814 B1 | 3/2012 | Schlansker et al. |
| 8,135,933 B2 | 3/2012 | Fisher et al. |
| 8,316,187 B2 | 11/2012 | Pothireddy |
| 8,352,709 B1 | 1/2013 | Glasco et al. |
| 8,560,761 B2 | 10/2013 | Tzeng |
| 8,700,724 B2 | 4/2014 | McDaniel et al. |
| 8,825,937 B2 | 9/2014 | Atkisson et al. |
| 8,838,887 B1 | 9/2014 | Burke et al. |
| 8,868,842 B2 | 10/2014 | Yano et al. |
| 8,930,647 B1 | 1/2015 | Smith |
| 8,965,819 B2 | 2/2015 | Tirunagari |
| 8,996,834 B2 | 3/2015 | Brenner et al. |
| 9,342,453 B2 | 5/2016 | Nale et al. |
| 9,619,408 B2 | 4/2017 | Nale et al. |
| 9,910,618 B1 | 3/2018 | Curley et al. |
| 10,120,797 B1 | 11/2018 | Foley et al. |
| 10,223,371 B2 | 3/2019 | Thirumal |
| 10,241,943 B2 | 3/2019 | Nale et al. |
| 10,282,322 B2 | 5/2019 | Nale et al. |
| 10,282,323 B2 | 5/2019 | Nale et al. |
| 10,289,566 B1 | 5/2019 | Dalmatov et al. |
| 10,430,723 B1 | 10/2019 | Tzur et al. |
| 2002/0196659 A1 | 12/2002 | Hurst et al. |
| 2003/0126232 A1 | 7/2003 | Mogul et al. |
| 2004/0186960 A1 | 9/2004 | Poggio |
| 2006/0087893 A1 | 4/2006 | Nishihara et al. |
| 2006/0095679 A1 | 5/2006 | Edirisooriya |
| 2006/0206658 A1 | 9/2006 | Hendel et al. |
| 2007/0033367 A1 | 2/2007 | Sakarda et al. |
| 2009/0113422 A1 | 4/2009 | Kani |
| 2009/0150639 A1 | 6/2009 | Ohata |
| 2010/0011169 A1 | 1/2010 | Pothireddy |
| 2010/0082899 A1 | 4/2010 | Nakajima et al. |
| 2010/0281230 A1 | 11/2010 | Rabii et al. |
| 2010/0293412 A1 | 11/2010 | Sakaguchi et al. |
| 2011/0161554 A1 | 6/2011 | Selinger et al. |
| 2011/0231857 A1 | 9/2011 | Zaroo et al. |
| 2011/0238887 A1 | 9/2011 | Bazzani |
| 2011/0238899 A1 | 9/2011 | Yano et al. |
| 2012/0047312 A1 | 2/2012 | Nathuji et al. |
| 2012/0054419 A1 | 3/2012 | Chen et al. |
| 2012/0084497 A1 | 4/2012 | Subramaniam et al. |
| 2013/0111113 A1 | 5/2013 | Harari et al. |
| 2013/0145095 A1 | 6/2013 | McKean et al. |
| 2013/0151761 A1 | 6/2013 | Kim et al. |
| 2013/0152086 A1 | 6/2013 | Yoo et al. |
| 2013/0226837 A1 | 8/2013 | Lymberopoulos et al. |
| 2014/0006740 A1 | 1/2014 | Tokusho et al. |
| 2014/0032818 A1 | 1/2014 | Chang et al. |
| 2014/0040550 A1 | 2/2014 | Nale et al. |
| 2014/0089631 A1 | 3/2014 | King |
| 2015/0026509 A1 | 1/2015 | Zhang et al. |
| 2015/0032921 A1 | 1/2015 | Malkin |
| 2015/0067087 A1 | 3/2015 | Guerin et al. |
| 2015/0082062 A1 | 3/2015 | Saraswat et al. |
| 2015/0097851 A1 | 4/2015 | Anderson et al. |
| 2015/0106656 A1 | 4/2015 | Bian et al. |
| 2015/0160858 A1 | 6/2015 | Okada et al. |
| 2015/0169238 A1 | 6/2015 | Lee et al. |
| 2015/0199276 A1 | 7/2015 | Radhakrishnan et al. |
| 2015/0212741 A1 | 7/2015 | Lee et al. |
| 2015/0227465 A1 | 8/2015 | Sundaram et al. |
| 2015/0268875 A1 | 9/2015 | Jeddeloh |
| 2015/0278091 A1 | 10/2015 | Wilkerson et al. |
| 2015/0356125 A1 | 12/2015 | Golander et al. |
| 2016/0054922 A1 | 2/2016 | Awasthi et al. |
| 2016/0188218 A1 | 6/2016 | Gray et al. |
| 2016/0188700 A1 | 6/2016 | Kleinschnitz, Jr. et al. |
| 2016/0210167 A1 | 7/2016 | Bolic et al. |
| 2016/0210251 A1 | 7/2016 | Nale et al. |
| 2016/0210465 A1 | 7/2016 | Craske et al. |
| 2016/0212214 A1 | 7/2016 | Rahman et al. |
| 2016/0253263 A1 | 9/2016 | Takada |
| 2016/0306557 A1 | 10/2016 | Koseki et al. |
| 2016/0350236 A1 | 12/2016 | Tsirkin et al. |
| 2017/0039164 A1 | 2/2017 | Ioannou et al. |
| 2017/0060754 A1 | 3/2017 | Nakra et al. |
| 2017/0123796 A1 | 5/2017 | Kumar et al. |
| 2017/0131902 A1 | 5/2017 | Goss et al. |
| 2017/0177486 A1 | 6/2017 | Horn |
| 2017/0249266 A1 | 8/2017 | Nale et al. |
| 2017/0255383 A1 | 9/2017 | Chang et al. |
| 2017/0285992 A1 | 10/2017 | Vogt |
| 2017/0302734 A1 | 10/2017 | Liang et al. |
| 2017/0316321 A1 | 11/2017 | Whitney et al. |
| 2017/0364422 A1 | 12/2017 | Antony et al. |
| 2017/0364450 A1 | 12/2017 | Struttmann |
| 2018/0011790 A1 | 1/2018 | Gaur et al. |
| 2018/0024853 A1 | 1/2018 | Warfield et al. |
| 2018/0046581 A1 | 2/2018 | Banerjee et al. |
| 2018/0089087 A1 | 3/2018 | Chang et al. |
| 2018/0121366 A1 | 5/2018 | Tian |
| 2018/0150219 A1 | 5/2018 | Chen et al. |
| 2018/0189207 A1 | 7/2018 | Nale et al. |
| 2018/0293163 A1 | 10/2018 | Bergeron |
| 2018/0316569 A1 | 11/2018 | Cilfone et al. |
| 2019/0004841 A1 | 1/2019 | Starks |
| 2019/0018809 A1 | 1/2019 | Nale et al. |
| 2019/0079689 A1 | 3/2019 | Cherubini et al. |
| 2019/0129847 A1 | 5/2019 | Roh |
| 2019/0179760 A1 | 6/2019 | Bhargava et al. |
| 2019/0243552 A1 | 8/2019 | Maharana et al. |
| 2019/0243570 A1 | 8/2019 | Mittal et al. |
| 2019/0243756 A1 | 8/2019 | Ray et al. |
| 2019/0243771 A1 | 8/2019 | Mittal et al. |
| 2019/0243787 A1 | 8/2019 | Mittal et al. |
| 2019/0253520 A1 | 8/2019 | Maharana et al. |
| 2019/0332556 A1 | 10/2019 | Nale et al. |
| 2020/0019506 A1 | 1/2020 | Ray et al. |
| 2020/0073827 A1 | 3/2020 | Wallach |
| 2020/0074094 A1 | 3/2020 | Wallach |

OTHER PUBLICATIONS

International Search Report and Written Opinion, PCT/US2019/014205, dated May 1, 2019.

International Search Report and Written Opinion, PCT/US2019/014285, dated May 8, 2019.

Cai, "Error Characterization, Mitigation and Recovery", 2017.

Vatto, "Analyzing Intel-Micron 3D XPoint: The NextGeneration Non-Volatile Memory", 2015.

A. Romanow, J. Mogul, T. Talpey, S. Bailey, "Remote Direct Memory Access (RDMA) over IP Problem Statement", RFC 4297, Dec. 2005 (https://www.rfc-editor.org/search/rfc_search_detail.php).

International Search Report and Written Opinion, PCT/US2019/013841, dated Apr. 23, 2019.

International Search Report and Written Opinion, PCT/US2019/013836, dated Apr. 22, 2019.

Predictive Data Orchestration in Multi-Tier Memory Systems, U.S. Appl. No. 16/054,819, filed Aug. 3, 2018, Samir Mittal et al., Publications—Issue Fee Payment Verified, May 29, 2020.

Predictive Data Orchestration in Multi-Tier Memory Systems, U.S. Appl. No. 16/905,834, filed Jun. 18, 2020, Samir Mittal et al., Application Dispatched from Preexam, Not Yet Docketed, Jun. 29, 2020.

Memory Systems having Controllers Embedded in Packages of Integrated Circuit Memory, U.S. Appl. No. 16/162,905, filed Oct. 17, 2018, Samir Mittal et al., Final Rejection dated Jul. 6, 2020.

Accelerate Data Access in Memory Systems Via Data Stream Segregation, U.S. Appl. No. 16/166,624, filed Oct. 22, 2018, Samir Mittal et al., Final Rejection dated Jul. 1, 2020.

Memory Virtualization for Accessing Heterogeneous Memory Components, U.S. Appl. No. 16/054,719, filed Aug. 3, 2018, Anirban Ray et al., Response to Non-Final Office Action Entered and Forwarded to Examiner, dated Apr. 13, 2020.

(56) References Cited

OTHER PUBLICATIONS

Remote Direct Memory Access in Multi-Tier Memory Systems, U.S. Appl. No. 16/107,624, filed Aug. 21, 2018, Parag Maharana et al., Final Rejection dated Jun. 1, 2020.
Optimization of Data Access and Communication in Memory Systems, U.S. Appl. No. 16/183,234, filed Nov. 7, 2018, Parag Maharana et al., Ex parte Quayle Action Mailed, Jun. 5, 2020.
Predictive Paging to Accelerate Memory Access, U.S. Appl. No. 16/032,331, filed Jul. 11, 2018, Anirban Ray et al., Non Final Action dated Sep. 20, 2019.
Predictive Data Orchestration in Multi-tier Memory Systems, U.S. Appl. No. 16/054,819, filed Aug. 3, 2018, Samir Mittal, et al, Docketed New Case—Ready for Examination, Sep. 30, 2018.
Memory Systems Having Controllers Embedded in Packages of Integrated Circuit Memory, U.S. Appl. No. 16/162,905, filed Oct. 17, 2018, Samir Mittal, et al, Docketed New Case—Ready for Examination, Sep. 4, 2018.
Accelerate Data Access in Memory Systems Via Data Stream Segregation, U.S. Appl. No. 16/166,624, filed Oct. 22, 2018, Samir Mittal, et al, Docketed New Case—Ready for Examination, Dec. 20, 2018.
Memory Virtualization for Accessing Heterogeneous Memory Components, U.S. Appl. No. 16/054,719, filed Aug. 3, 2018, Anirban Ray, et al, Docketed New Case—Ready for Examination, Sep. 30, 2018.
Remote Direct Memory Access in Multi-tier Memory Systems, U.S. Appl. No. 16/107,624, filed Aug. 21, 2018, Parag Maharana, et al, Docketed New Case—Ready for Examination, Oct. 15, 2018.
Optimization of Data Access and Communication in Memory Systems, U.S. Appl. No. 16/183,234, filed Nov. 7, 2018, Parag Maharana, et al, Docketed New Case—Ready for Examination, Jan. 11, 2019.
Predictive Paging to Accelerate Memory Access, U.S. Appl. No. 16/032,331, filed Jul. 11, 2018, Anirban Ray, et al, Docketed New Case—Ready for Examination, Aug. 24, 2018.

Oracle, "NFS Over ROMA", Retrieved on Feb. 18, 2020 from https://web.archive.org/web/20150920225910/https://docs.oracle.com/cd/E23824_01/html/821-1454/rfsrefer-154.html# (Year: 2015).
International Search Report, PCT/US2019/040413, dated Oct. 25, 2019.
Jeff Hawkins et al., "Sequence memory for prediction, inference and behaviour", in: Philosophical Transactions of the Royal Society B: Biological Sciences, pp. 1203-1209, May 1, 2009.
International Search Report and Written Opinion, PCT/US2019/014275, dated May 8, 2019.
International Search Report and Written Opinion, PCT/US2020/021825, dated Jul. 6, 2020.
"Solid-State Drive", Wikipedia, printed on Mar. 14, 2018.
"Write combining," Wikipedia encyclopedia entry located at https://en.wikipedia.org/wiki/Write_combining, Feb. 12, 2018.
Demand paging, Wikipedia, printed on Apr. 18, 2018.
Device driver, Wikipedia, printed on Apr. 19, 2018.
Garbage collection (computer science), Wikipedia, printed on Sep. 26, 2018.
Graphics processing unit, Wikipedia, printed on Jul. 26, 2018.
Hypervisor, Wikipedia, printed on Apr. 19, 2018.
InfiniBand, Wikipedia, printed on Jul. 26, 2018.
Integrated circuit, Wikipedia, printed on Sep. 24, 2018.
Interlaken (networking), Wikipedia, printed on Sep. 21, 2018.
Message Passing Interface, Wikipedia, printed on Jul. 26, 2018.
Microsequencer, Wikipedia, printed on Sep. 21, 2018.
Operating system, Wikipedia, printed on Apr. 18, 2018.
PCI Express, Wikipedia, printed on Sep. 21, 2018.
Page cache, Wikipedia, printed on Apr. 18, 2018.
Page replacement algorithm, Wikipedia, printed on Jul. 31, 2018.
Page table, Wikipedia, printed on Jul. 31, 2018.
Paging, Wikipedia, printed on Apr. 18, 2018.
RAM drive, Wikipedia, printed on Apr. 18, 2018.
SerDes, Wikipedia, printed on Sep. 21, 2018.
Switched fabric, Wikipedia, printed on Jul. 26, 2018.
Translation lookaside buffer, Wikipedia, printed on Apr. 18, 2018.
Virtual memory, Wikipedia, printed on Apr. 18, 2018.
Mmap, Wikipedia, printed on Apr. 18, 2018.

PREDICTIVE DATA PRE-FETCHING IN A DATA STORAGE DEVICE

FIELD OF THE TECHNOLOGY

At least some embodiments disclosed herein relate to memory systems in general, and more particularly, but not limited to predictive data pre-fetching in data storage devices.

BACKGROUND

A memory sub-system can include one or more memory components that store data. A memory sub-system can be a data storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

A computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

A host system can communicate with a memory sub-system in accordance with a pre-defined communication protocol, such as Non-Volatile Memory Host Controller Interface Specification (NVMHCI), also known as NVM Express (NVMe), which specifies the logical device interface protocol for accessing non-volatile storage devices via a Peripheral Component Interconnect Express (PCI Express or PCIe) bus. In accordance with the communication protocol, the host system can send commands of different types to the memory sub-system; and the memory sub-system can execute the commands and provide responses to the commands. Some commands instruct the memory sub-system to store data items at addresses specified in the commands, or to retrieve data items from addresses specified in the commands, such as read commands and write commands. Some commands manage the infrastructure in the memory sub-system and/or administrative tasks, such as commands to manage namespaces, commands to attach namespaces, commands to create input/output submission or completion queues, commands to delete input/output submission or completion queues, commands for firmware management, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
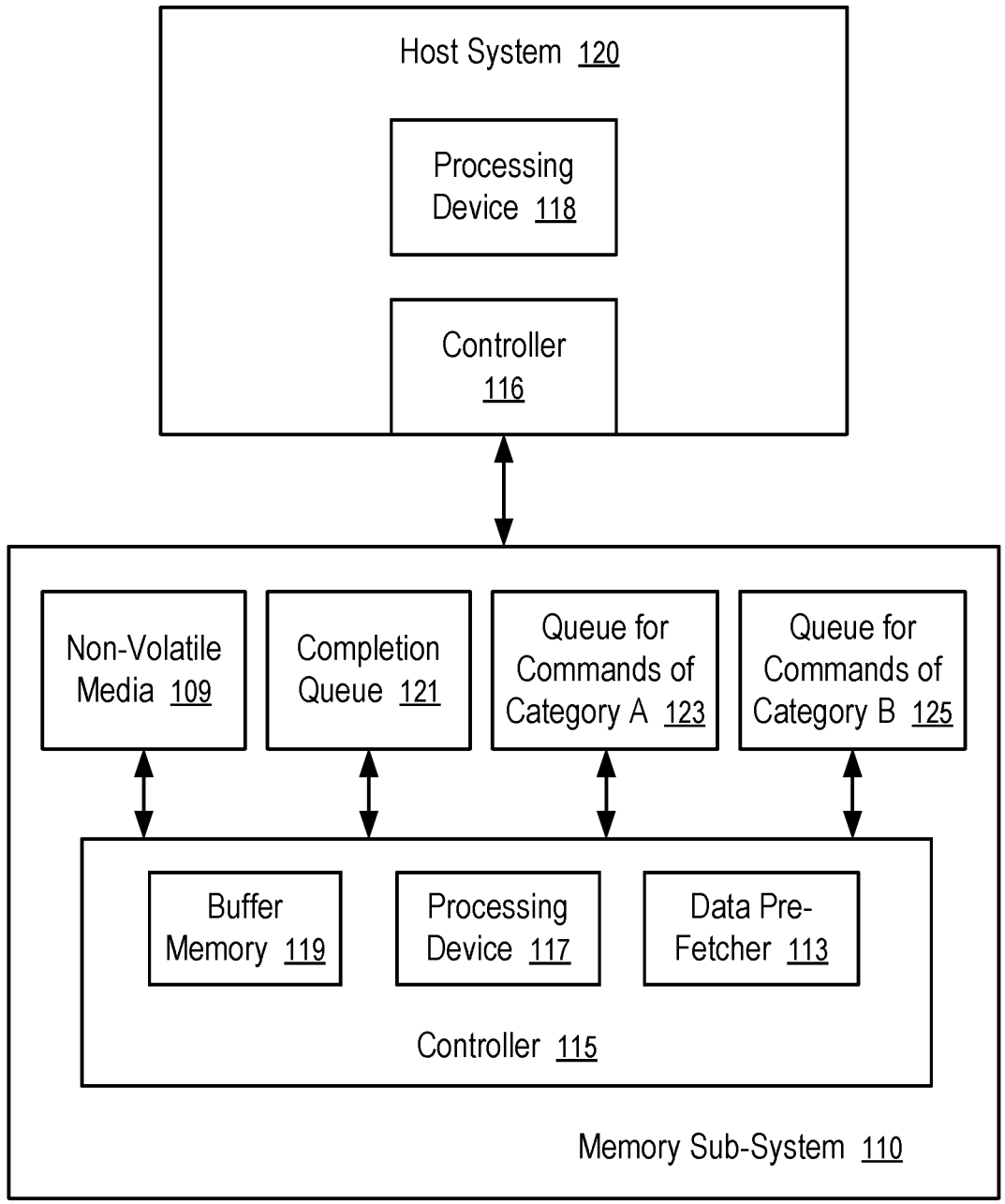
FIG. 1 illustrates an example computing system having a memory sub-system in accordance with some embodiments of the present disclosure.

At least some aspects of the present disclosure are directed to predictive pre-fetching data for commands that can increase execution latency of other commands executed concurrently in a data storage device. For example, a predictive model is configured in a data storage device to identify such commands that can cause significant delays in the execution of other commands. The data used by the identified commands can be pre-fetched from non-volatile storage media of the data storage device to buffer memory of the storage device. Pre-fetching the data to the buffer memory can reduce, minimize and/or eliminate the delays caused by the identified commands in the execution of other commands. The predictive model can be established by applying machine learning techniques on a training set of commands, using the execution latency data of the commands in the training set.

In general, infrastructure commands can be used to manage, configure, administrate, or report on the status of, the infrastructure in a data storage system. Certain infrastructure command can often cause unexpected increases in latency in the execution of other commands that not related to such commands. Such infrastructure commands can have high latency. When certain resources in the data storage system are used for the execution of the high latency infrastructure commands, the resources become unavailable for the execution of other commands, causing apparently random delays in the execution of other commands that may use the resources.

In at least some embodiments disclosed herein, a predictive model is configured to predict infrastructure commands that are most likely to increase latency of other commands. The prediction is based on some characteristics of commands that are currently queued for processing in the data storage system. The prediction allows the data storage system to pre-fetch data from non-volatile storage media to buffer memory for the predicted infrastructure commands. After the pre-fetching of the data for the predicted commands, the likelihood of the predicted infrastructure commands using resources during their execution to access the non-volatile storage media and make them unavailable for execution of other commands is reduced. Therefore, the impact of the execution of the infrastructure commands on other commands can be reduced, minimized, and/or eliminated.

For example, a supervised machine learning technique can be applied to a group of commands in a training data set. The training data set can have a mixed set of infrastructure commands of different types and other commands of different types. The training set of commands can represent an example of workload for a data storage device/system, or a real workload during a period of service. Some parameters of the commands in the training set can be used as input parameters to the predictive model, such as the types of commands, the regions in the storage system being accessed by the commands, etc. The measured latency in the execution of the commands in the training set can be used to identify infrastructure commands that have high impact on the execution of other commands and infrastructure commands that do not have high impact on the execution of other commands. For example, high impact commands cause more than a threshold amount of increased latency in the execution of other commands; and low impact commands cause no more than the threshold amount of increase in latency of other commands. The supervised machine learning technique can be used to train the predictive model by adjusting the parameters in the predictive model to minimize the differences between the classification/prediction of the infrastructure commands identified by the predictive model and the classification/prediction of infrastructure commands identified from the latency data in the training data set.

For example, the predictive model can be trained to classify a sequence of commands. Each infrastructure commands in the sequence can be classified as either having potential for high impact or not having the potential for the commands in the sequence.

For example, the predictive model can be trained to predict, for a sequence of commands, latency increases caused by an infrastructure command in the sequence in the execution of other commands in the sequence. The predicted increases in execution latency can be compared with a threshold to classify the infrastructure command as either a high impact command, or a low impact command.

For example, the predictive model can be trained to predict, for a sequence of commands, an infrastructure command that will enter the data storage device/system to cause more than a threshold amount of increase in the execution latency of some of the commands in the sequence. The prediction can be made based on the pattern of infrastructure commands and other commands.

For example, the predictive model can be based on statistical correlation using logistic regression and/or an artificial neural network.

For example, different sets of training sets can be used for data storage systems having different structures and different configurations.

A data storage system of a particular design can be initially configured with a predictive model trained according to a typical workload of commands for the design. Subsequently, the predictive model can be further trained and/or updated for the typical workload of the data storage system in a computer system and/or based on a recent real-time workload of the data storage system.

Optionally, the data storage system can be further configured to monitor differences between the real-time predictions made using the predictive model and subsequent measurement of increased latency in command executions to further train the predictive model periodically to adapt its predictive capability in accordance with the real-time workload.

During the usage of the data storage system that has a predictive model, the incoming commands to be executed by the data storage system can be provided as input to the predictive model to identify a table of commands scheduled/suggested for pre-fetching.

For example, the predictive model can be used to process a predetermined number of commands pending in one or more queues for execution (e.g., 1000 commands) or once every predetermined time period (e.g., 10 ms). During the use of the predictive model, the commands pending for execution by the data storage system can be fed into the predictive model to identify a table of high impact commands for pre-fetching. The data storage system is configured to pre-fetch the data that is likely to be used by the high impact commands in the table before the actual execution of the high impact commands, such that impact of the execution of the high impact commands is distributed to a large number of other commands. Further, the pre-fetching can be configured to use spare resources that are not used/required for the execution of the other commands, which are executed before the high impact commands; and such an arrangement can reduce the overall impact of the high impact commands on other commands.

In some instances, the predictive model can predict an infrastructure command before the host system sends the infrastructure command to the data storage system and/or before the infrastructure command is retrieved from a queue for execution. The data storage system can use a flag to indicate whether or not the pre-fetched data for the predicted infrastructure command is valid.

In general, a memory sub-system can also be referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc.

Another example of a memory sub-system is a data storage device/system that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD).

In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

FIG. 1 illustrates an example computing system having a memory sub-system (110) in accordance with some embodiments of the present disclosure.

The memory sub-system (110) can include non-volatile media (109) that includes memory components. In general, memory components can be volatile memory components, non-volatile memory components, or a combination of such. In some embodiments, the memory sub-system (110) is a data storage system. An example of a data storage system is an SSD. In other embodiments, the memory sub-system (110) is a memory module. Examples of a memory module includes a DIMM, NVDIMM, and NVDIMM-P. In some embodiments, the memory sub-system (110) is a hybrid memory/storage sub-system.

In general, the computing environment can include a host system (120) that uses the memory sub-system (110). For example, the host system (120) can write data to the memory sub-system (110) and read data from the memory sub-system (110).

The host system (120) can be part of a computing device, such as a desktop computer, laptop computer, network server, mobile device, or such computing device that includes a memory and a processing device. The host system (120) can include or be coupled to the memory sub-system (110) so that the host system (120) can read data from or write data to the memory sub-system (110). The host system (120) can be coupled to the memory sub-system (110) via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data and/or commands between the host system (120) and the memory sub-system (110). The host system (120) can further utilize an NVM Express (NVMe) interface to access the non-volatile media (109) when the memory sub-system (110) is coupled with the host system (120) by the PCIe interface. The physical host interface can provide an interface for passing control, address, data, and other signals between the memory sub-system (110) and the host system (120). FIG. 1 illustrates a memory sub-system (110) as an example. In general, the host system (120) can access multiple memory sub-systems via a same communication connection, multiple separate communication connections, and/or a combination of communication connections.

The host system (120) includes a processing device (118) and a controller (116). The processing device (118) of the host system (120) can be, for example, a microprocessor, a central processing unit (CPU), a processing core of a processor, an execution unit, etc. In some instances, the controller (116) can be referred to as a memory controller, a memory management unit, and/or an initiator. In one example, the controller (116) controls the communications over a bus coupled between the host system (120) and the memory sub-system (110).

In general, the controller (116) can send commands or requests to the memory sub-system (110) for desired access to non-volatile media (109). The controller (116) can further include interface circuitry to communicate with the memory sub-system (110). The interface circuitry can convert responses received from memory sub-system (110) into information for the host system (120).

The controller (116) of the host system (120) can communicate with controller (115) of the memory sub-system (110) to perform operations such as reading data, writing data, or erasing data in the non-volatile media (109) and other such operations. In some instances, the controller (116) is integrated within the same package of the processing device (118). In other instances, the controller (116) is separate from the package of the processing device (118). The controller (116) and/or the processing device (118) can include hardware such as one or more integrated circuits and/or discrete components, a buffer memory, a cache memory, or a combination thereof. The controller (116) and/or the processing device (118) can be a microcontroller, special purpose logic circuitry (e.g., a field programmable gate array (FPGA), an application specific integrated circuit (ASIC), etc.), or another suitable processor.

The non-volatile media (109) can include any combination of the different types of non-volatile memory components. In some instances, volatile memory components can also be used. An example of non-volatile memory components includes a negative-and (NAND) type flash memory. A memory component in the media (109) can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system (120). Although non-volatile memory components such as NAND type flash memory are described, the memory components used in the non-volatile media (109) can be based on any other type of memory. Further, a volatile memory can be used. In some embodiments, the memory components in the media (109) can include, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-M RAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, or a cross-point array of non-volatile memory cells, or any combinations thereof. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components in the media (109) can be grouped as memory pages or data blocks that can refer to a unit of the memory component used to store data.

The controller (115) of the memory sub-system (110) can communicate with the memory components in the media (109) to perform operations such as reading data, writing data, or erasing data at the memory components and other such operations (e.g., in response to commands scheduled on a command bus by controller (116)). The controller (115) can include hardware such as one or more integrated circuits and/or discrete components, a buffer memory, or a combination thereof. The controller (115) can be a microcontroller, special purpose logic circuitry (e.g., a field programmable gate array (FPGA), an application specific integrated circuit (ASIC), etc.), or another suitable processor. The controller (115) can include a processing device (117) (e.g., processor) configured to execute instructions stored in local memory (119). In the illustrated example, the buffer memory (119) of the controller (115) includes an embedded memory configured to store instructions for performing various processes, operations, logic flows, and routines that control operation of the memory sub-system (110), including handling communications between the memory sub-system (110) and the host system (120). In some embodiments, the controller (115) can include memory registers storing memory pointers, fetched data, etc. The controller (115) can also include read-only memory (ROM) for storing micro-code. While the example memory sub-system (110) in FIG. 1 has been illustrated as including the controller (115), in another embodiment of the present disclosure, a memory sub-system (110) may not include a controller (115), and can instead rely upon external control (e.g., provided by an external host, or by a processor or controller separate from the memory sub-system).

In general, the controller (115) can receive commands or operations from the host system (120) and can convert the commands or operations into instructions or appropriate commands to achieve the desired access to the memory components in the media (109). The controller (115) can be responsible for other operations such as wear leveling operations, garbage collection operations, error detection and error-correcting code (ECC) operations, encryption operations, caching operations, and address translations between a logical block address and a physical block address that are associated with the memory components in the media (109). The controller (115) can further include host interface circuitry to communicate with the host system (120) via the physical host interface. The host interface circuitry can convert the commands received from the host system into command instructions to access the memory components in the media (109) as well as convert responses associated with the memory components into information for the host system (120).

The memory sub-system (110) can also include additional circuitry or components that are not illustrated. In some embodiments, the memory sub-system (110) can include a cache or buffer (e.g., DRAM) and address circuitry (e.g., a row decoder and a column decoder) that can receive an address from the controller (115) and decode the address to access the memory components of the media (109).

The computing system includes a data pre-fetcher (113) in the memory sub-system (110) that can retrieve data from the non-volatile media (109) to the buffer memory (119) for predicted high impact commands. The predicted high impact commands can cause more than a threshold amount of increase in execution latency of other commands when the data is not pre-fetched to the buffer memory (119) before the execution of the high impact commands.

In some embodiments, the controller (115) in the memory sub-system (110) includes at least a portion of the data pre-fetcher (113). In other embodiments, or in combination, the controller (116) and/or the processing device (118) in the host system (120) includes at least a portion of the data pre-fetcher (113). For example, the controller (115), the controller (116), and/or the processing device (118) can include logic circuitry implementing the data pre-fetcher (113). For example, the controller (115), or the processing device (118) (processor) of the host system (120), can be configured to execute instructions stored in memory for performing the operations of the data pre-fetcher (113) described herein. In some embodiments, the data pre-fetcher (113) is implemented in an integrated circuit chip disposed in the memory sub-system (110). In other embodiments, the data pre-fetcher (113) is part of an operating system of the host system (120), a device driver, or an application.

The memory sub-system (110) can have a queue (123) for commands of one category, and another queue (125) for commands of another category. For example, the queue (123) can be configured for typical input/output commands, such as read commands and write commands. The queue (125) can be configured for infrastructure commands that are not typical input/output commands. Some of the infrastructure commands can be high impact commands that cause more than a threshold amount of latency increase in the execution of certain commands in the queue (123). The memory sub-system (110) can include one or more completion queue (121) for the reporting, to the host system (120), the results of the executions of commands in the command queues (123 and 125). In some implementations, one or more queues can be created in response to commands from the host system (120). Thus, the memory sub-system (110) in general is not limited to a particular number of queues illustrated in FIG. 1.

The data pre-fetcher (113) is configured to predict/classify some of the commands of the category in the queue (125) as high impact commands. Before a high impact command is retrieved from the command queue (125) for execution, the data pre-fetcher (113) is configured to load data that may be used by the high impact command from the non-volatile media (109) to the buffer memory (119). The loading of the data in preparation of the execution of the high impact command can be performed to use resources that are not used in the execution of commands from the queue (123) to improve resource utilization and reduce the overall impact of the high impact command. Alternatively, or in combination, the loading of the data in preparation of the execution of the high impact command can be performed to spread its impact among the execution of more commands from the queue (123) such that its impact is not concentrated on one or more commands that are executed concurrently with the execution of the high impact command.

FIG. 1 illustrates an example where high impact commands are known to be in a specific queue (e.g., 125). In other implementations, different categories of commands can be mixed in a same queue. For example, an infrastructure command can be placed in a same queue of non-infrastructure commands in some systems; and the techniques of the present disclosure can also be used to predict the high impact commands and pre-fetch data to the buffer memory for the high impact commands. Thus, the application of the techniques of the present disclosure is not limited to a specific command queue structure.

Figure 2:
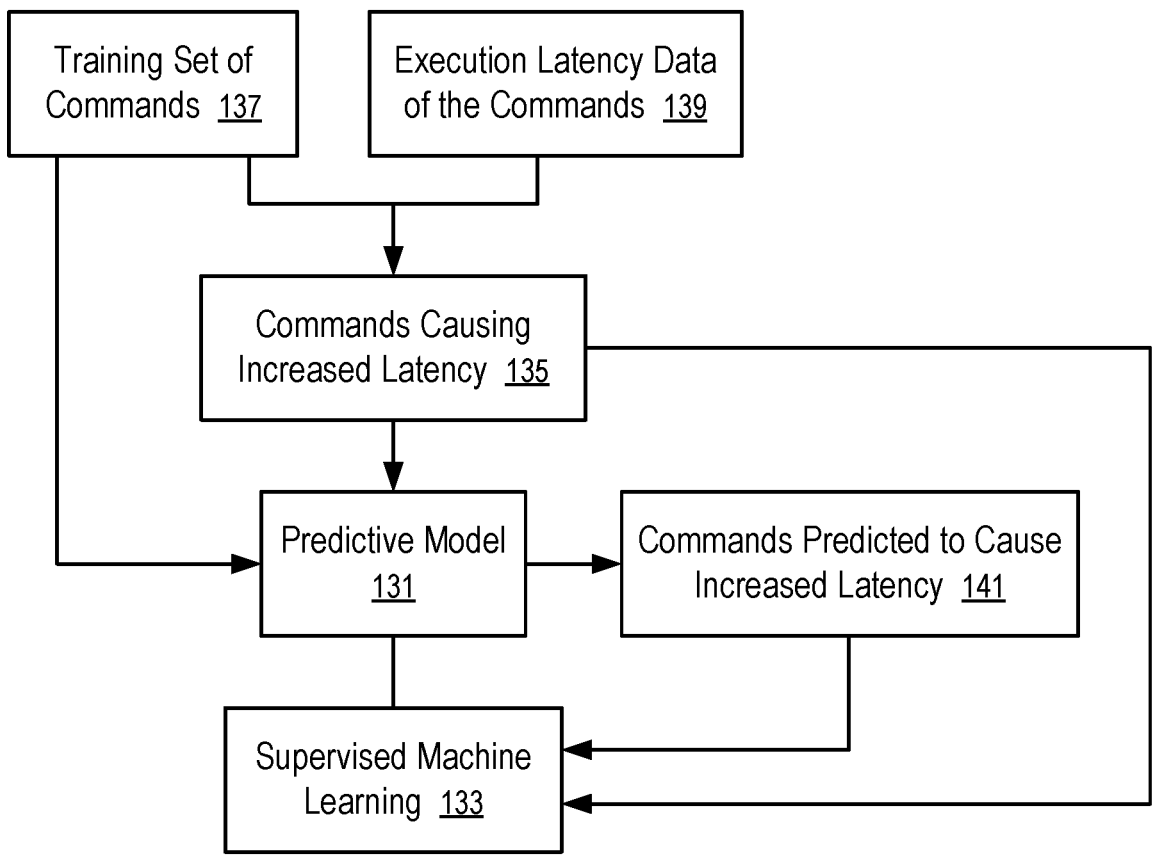
FIG. 2 illustrates a system configured to train a predictive model to identify commands that can cause increased latency in the execution of other commands.

FIG. 2 illustrates a system configured to train a predictive model (131) to identify commands that can cause increased latency in the execution of other commands.

For example, the predictive model (131) of FIG. 2 can be configured in the data pre-fetcher (113) in a memory sub-system (110) of FIG. 1.

In FIG. 2, a training set of commands (137) is used capture the patterns of latency impacts of different types of commands on each other. The training set of commands (137) can be an example of commands representing a typical workload for a memory sub-system (110), or the actual workload of a memory sub-system (110) during a particular period of usage in a computer system of FIG. 1.

During the execution of the commands in the training set in the memory sub-system (110) (e.g., without using the data pre-fetcher (113)), the execution latency data (139) of the commands in the training set is measured. The execution latency data (139) can be used to identify high impact commands (135) that cause increased latency.

For example, the average execution latency of commands of a specific type can be computed from the execution latency data (139). For each respective command in the training set, the increased latency for the execution of the respective command can be computed from the difference between the actual execution latency of the command and the average execution latency of commands that are of the same type as the command. When the latency increase is above a threshold, the command is considered to have received high impact. In a time window of the execution of the command that has received high impact in latency, other commands being executed in the time window and/or concurrently with the execution of the command can be examined to identify a high impact command that causes the high impact. For example, an infrastructure command executed in the time window can be identified as the source of the high impact; and thus, the infrastructure command can be identified as a high impact command. For example, a command of a particular category and executed in the time window can be identified as the source of the high impact; and thus, the command can be identified as a high impact command. For example, an command of a type with an average execution latency above a threshold and executed in the time window can be identified as the source of the high impact; and thus, the command can be identified as a high impact command.

In FIG. 2, the predictive model (131) is configured to identify high impact commands (141) that are predicted to cause increased latency from the training set of commands. The predictive model (131) computes the predictions (141) based on parameters of the commands in the training set and/or the order in which the commands appear in the training set. The parameters can include the types of the commands in the training set and/or the address areas/regions accessed by the commands. Supervised machine learning (133) is applied to the predictive model (131) to reduce or minimize the differences between the high impact commands (135) identified from the execution latency data (139) and the high impact commands (141) predicted by the prediction model (131).

Figure 3:
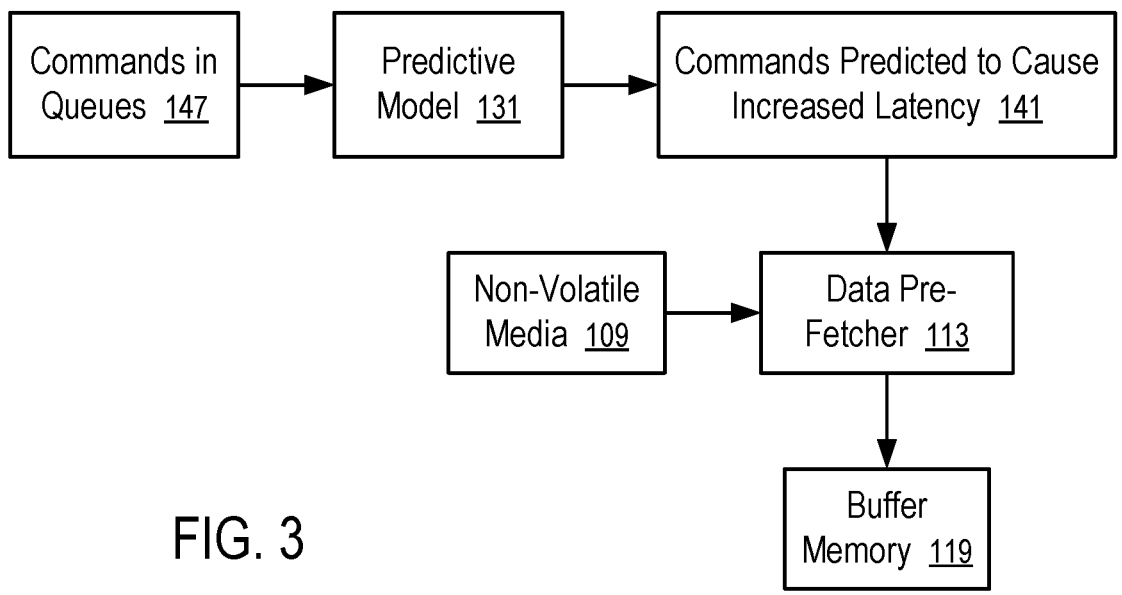
FIG. 3 illustrates a system having a predictive model to pre-fetch data of commands from non-volatile media to buffer memory.

After the training of the predictive model (131) using a technique of supervised machine learning (133), the predictive model (131) can be used in a data pre-fetcher (113) of a memory sub-system (110) of FIG. 1 and/or a system as illustrated in FIG. 3.

FIG. 3 illustrates a system having a predictive model (131) to pre-fetch data of commands from non-volatile media (109) to buffer memory (119). For example, the system of FIG. 3 can be the memory sub-system (1110) of FIG. 1.

In FIG. 3, commands in one or more queues (e.g., 123 and/or 125) are provided as inputs to the predictive model (131) to generate predictions of high impact commands (141) that can cause increased latency. A data pre-fetcher (113) is configured to retrieve data from non-volatile media (109) to buffer memory (119) prior to the actual execution of the high impact commands (141) predicted by the predictive model (131).

Typically, accessing the non-volatile media (109) for an amount of data takes a longer time period than accessing the buffer memory (119). Further, the system can have less resources for accessing the non-volatile media (109) for concurrently executing multiple commands than for accessing the buffer memory (119). Thus, when the data to be used by a high impact command is pre-fetched into the buffer memory (119), its impact on the concurrent execution of other commands can be reduced.

Figure 4:
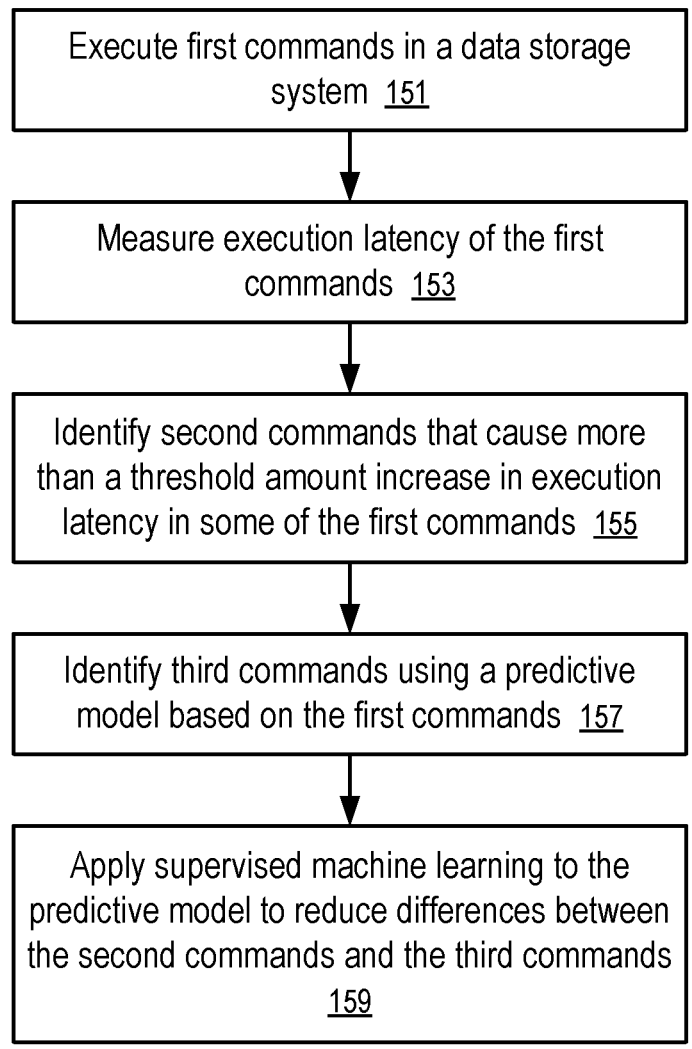
FIG. 4 shows a method to train a predictive model to identify high impact commands.

FIG. 4 shows a method to train a predictive model to identify commands that have a high probability of causing significant delay in the execution of other commands. For example, the method of FIG. 4 can be implemented in a computer system of FIG. 1 using the technique discussed in connection with FIG. 2.

At block 151, first commands (e.g., 137) are executed in a data storage system.

The first commands can be a sample of commands that are typical in data storage systems having the same or similar structure as the data storage system. Optionally, the first commands can be the real-life workload of the data storage system in a period of time.

At block 153, the data storage system (or a host connected to the data storage system) measures the execution latency of the first commands. For example, the execution latency of a command can be measured as the time duration between the command being retrieved from a queue for execution and the completion of execution of the command in the data storage system. A typical command retrieves data from an address specified in the command, or writes data at an address specified in the command.

At block 155, a computing device is used to identify second commands (e.g., 135) that cause more than a threshold amount increase in execution latency in some of the first commands. The computing device can be a computer that is separate from the data storage system and/or the host system of the data storage system, or the host system of the data storage system, or the controller of the data storage system.

For example, the second commands can be identified by computing the average latency for different command types, identifying impacted commands that have execution latency exceeding the averages of their respective command types by more than a threshold amount, and identifying the second commands that have been executed concurrently with the impacted commands and that have a predetermined characteristic. For example, the predetermined characteristic can be a pre-defined command category (e.g., infrastructure commands), commands of a type having an average latency that is above a threshold, and/or other attributes.

At block 157, the computing device identifies third commands (e.g., 141) using a predictive model (131) based on the first commands.

At block 159, the computing device applies supervised machine learning (133) to the predictive model (131) to reduce differences between the second commands (e.g., 135) and the third commands (141).

Figure 5:
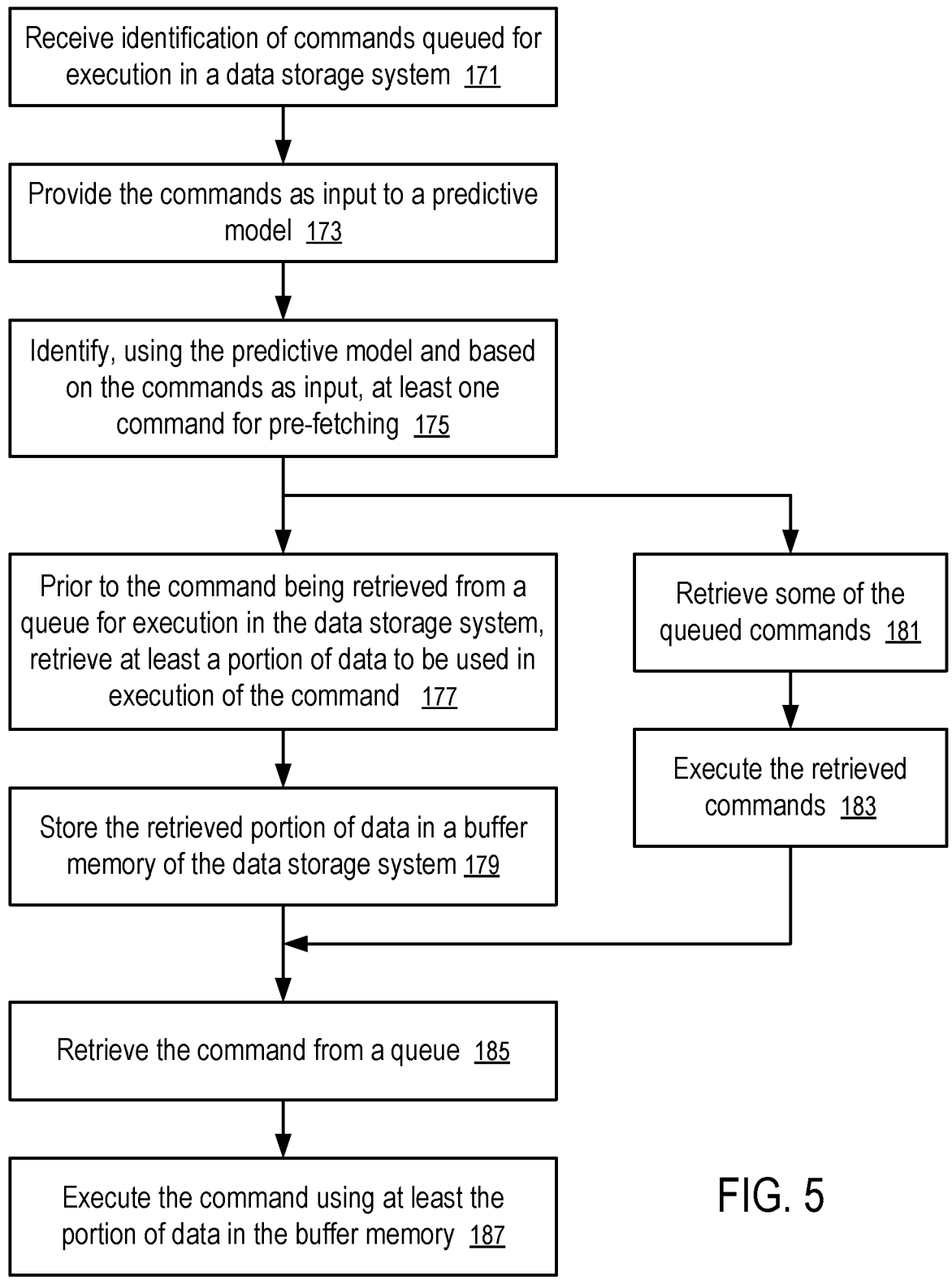
FIG. 5 shows a method to pre-fetch data for high impact commands based on the predictions of a predictive model.

FIG. 5 shows a method to pre-fetch data for high impact commands based on the predictions of a predictive model (e.g., 131), which can be trained using the method of FIG. 4.

For example, the method of FIG. 5 can be implemented in a computer system of FIG. 1 using the technique discussed in connection with FIG. 3.

At block 171, a data pre-fetcher (113) of a data storage system (e.g., 110) receives identification of commands that are queued for execution in the data storage system.

At block 173, the data pre-fetcher (113) provides the commands as input to the predictive model (131).

At block 175, the data pre-fetcher (113) identifies, using the predictive model (131) and based on the commands as input, at least one command for pre-fetching.

Prior to the command being retrieved from a queue for execution in the data storage system, the data pre-fetcher (113) retrieves at least a portion of data to be used in execution of the command at block 177 and store the retrieved portion of data in a buffer memory (119) of the data storage system at block 179.

Concurrently, a controller (115) of the data storage system retrieves some of the queued commands at block 181 and executes the retrieved commands at block 183.

Preferably, the retrieving (177) and storing (179) of the portion of data for the pre-fetched command are performed using resources that are not required/used in the concurrently execution (183) of the commands. such an arrangement reduces the overall impact of the command on other commands as a whole. Alternatively, or in combination, the impact of the retrieving (177) and storing (179) of the portion of data for the pre-fetched command is distributed among the execution (183) of many commands such that the impact on each individual command is reduced and small.

Subsequently, the controller (115) of the data storage system retrieves the command from a queue at block 185 and executes the command using at least the portion of data in the buffer memory At block 187.

Since at least the portion of data is in the buffer memory, the execution of the command has less impact on the execution latency of other commands that are executed concurrently with the execution of the command.

Optionally, the data pre-fetcher (113) can include the supervised machine learning (133) functionality illustrated in FIG. 2 and/or discussed in FIG. 4. For example, the data pre-fetcher (113) can measure the execution latency (139) of commands, identify commands (135) causing increased latency, and use the supervise machine learning (133) to minimize the number of commands that are predicted to not cause increased latency (141) but are found to have caused increased latency (135) based the measured execution latency data (139).

In some implementations, a communication channel between the processing device (118) and a memory sub-system includes a computer network, such as a local area network, a wireless local area network, a wireless personal area network, a cellular communications network, a broadband high-speed always-connected wireless communication connection (e.g., a current or future generation of mobile network link); and the processing device (118) and the memory sub-system can be configured to communicate with each other using data storage management and usage commands similar to those in NVMe protocol.

A memory sub-system in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller (e.g., 115) of a memory sub-system (e.g., 110) can run firmware to perform operations responsive to the communications from the processing device (118). Firmware in general is a type of computer program that provides control, monitoring and data manipulation of engineered computing devices.

Some embodiments involving the operation of the controller (115) and/or the data pre-fetcher (113) can be implemented using computer instructions executed by the controller (115), such as the firmware of the controller (115). In some instances, hardware circuits can be used to implement at least some of the functions. The firmware can be initially stored in the non-volatile storage media, or another non-volatile device, and loaded into the volatile DRAM and/or the in-processor cache memory for execution by the controller (115).

A non-transitory computer storage medium can be used to store instructions of the firmware of a memory sub-system (e.g., 110). When the instructions are executed by the controller (115) and/or the processing device (117), the instructions cause the controller (115) and/or the processing device (117) to perform a method discussed above.

Figure 6:
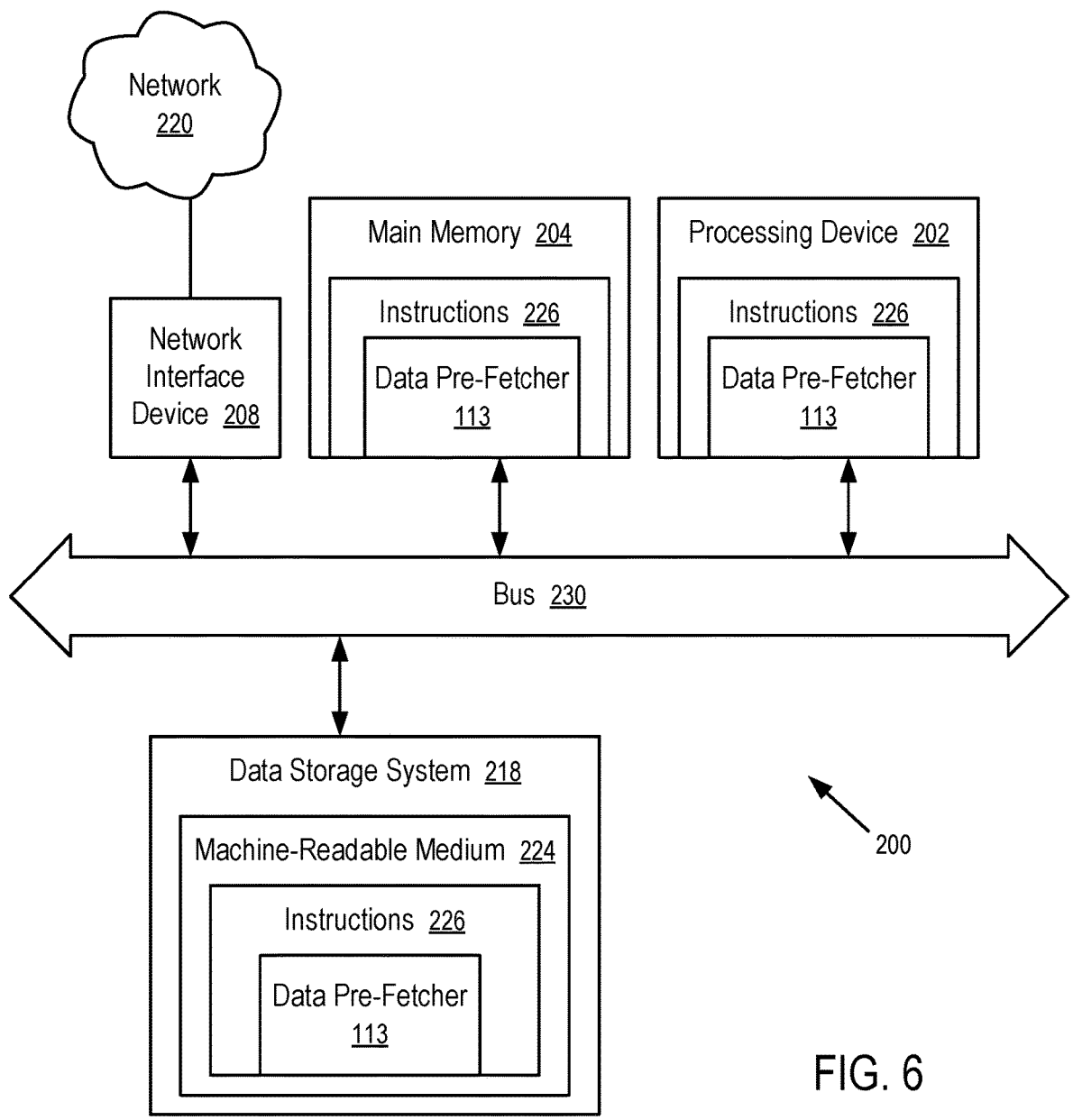
FIG. 6 is a block diagram of an example computer system in which embodiments of the present disclosure can operate.

FIG. 6 illustrates an example machine of a computer system (200) within which a set of instructions, for causing the machine to perform any one or more of the methodologies discussed herein, can be executed. In some embodiments, the computer system (200) can correspond to a host system (e.g., the host system (120) of FIG. 1) that includes, is coupled to, or utilizes a memory sub-system (e.g., the memory sub-system (110) of FIG. 1) or can be used to perform the operations of a data pre-fetcher (113) (e.g., to execute instructions to perform operations corresponding to the data pre-fetcher (113) described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system (200) includes a processing device (202), a main memory (204) (e.g., read-only memory (ROM), flash memory, dynamic random access memory (DRAM) such as synchronous DRAM (SDRAM) or Rambus DRAM (RDRAM), static random access memory (SRAM), etc.), and a data storage system (218), which communicate with each other via a bus (230) (which can include multiple buses).

Processing device (202) represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device (202) can also be one or more special-purpose processing devices such as an application specific integrated circuit (ASIC), a field programmable gate array (FPGA), a digital signal processor (DSP), network processor, or the like. The processing device (202) is configured to execute instructions (226) for performing the operations and steps discussed herein. The computer system (200) can further include a network interface device (208) to communicate over the network (220).

The data storage system (218) can include a machine-readable storage medium (224) (also known as a computer-readable medium) on which is stored one or more sets of instructions (226) or software embodying any one or more of the methodologies or functions described herein. The instructions (226) can also reside, completely or at least partially, within the main memory (204) and/or within the processing device (202) during execution thereof by the computer system (200), the main memory (204) and the processing device (202) also constituting machine-readable storage media. The machine-readable storage medium (224), data storage system (218), and/or main memory (204) can correspond to the memory sub-system (110) of FIG. 1.

In one embodiment, the instructions (226) include instructions to implement functionality corresponding to a data pre-fetcher (113) (e.g., the data pre-fetcher (113) described with reference to FIGS. 1-5). While the machine-readable storage medium (224) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A data storage system, comprising:
   non-volatile media;
   a buffer memory;
   a processing device coupled to the buffer memory and the non-volatile media; and
   a data pre-fetcher configured to:
      receive commands to be executed in the data storage system;
      provide the commands as input to a predictive model;
      identify, using the predictive model and based on the commands, at least one command for pre-fetching; and
      prior to the command being executed in the data storage device,
         retrieve, from the non-volatile memory, at least a portion of data to be used in execution of the command; and
         store the portion of data in the buffer memory.

2. The data storage system of claim 1, wherein the data pre-fetcher configured to use the predictive model periodically.

3. The data storage system of claim 1, wherein the data pre-fetcher configured to provide the commands of a pre-determined number as input to the predictive model during each use of the predictive model.

4. The data storage system of claim 1, wherein the predictive model is trained using a supervised machine learning technique.

5. The data storage system of claim 4, wherein the data pre-fetcher configured to spread latency impact of the command over more than a threshold number of commands.

6. The data storage system of claim 4, wherein the data pre-fetcher configured to retrieve the portion of data from the non-volatile memory and store the portion of data in the buffer memory during execution of a plurality of commands, using resources that are not required for the execution of the plurality of commands.

7. The data storage system of claim 4, wherein the command is predicted to cause more than a threshold amount of increase in latency in execution of a further command if the portion of data is not available in the buffer memory.

8. The data storage system of claim 4, wherein the command is identified by the predictive model based at least in part that the command is in a predetermined category.

9. The data storage system of claim 8, wherein commands in the predetermined category have an average in execution latency that is longer than a threshold.

10. The data storage system of claim 9, further configured to:
    generate latency data of second commands executed in the data storage system;
    identify, from the latency data, the third commands causing more than a threshold amount of increase in latency in execution of at least one of the second commands; and
    train the predictive model using the supervised machine learning technique to reduce differences between third commands identified using the latency data and commands identified by the predictive model from the second commands.

11. A method, comprising:
    receiving, in a controller of a data storage system, commands from a host system for execution in the data storage system;
    providing, to a predictive model, the commands as input;
    identifying, using the predictive model and based on the commands as input, at least one command for pre-fetching; and
    prior to the command being executed in the data storage device,
       retrieving, from non-volatile memory of the data storage media, at least a portion of data to be used in execution of the command; and
       storing the portion of data in buffer memory of the data storage system.

12. The method of claim 11, wherein the predictive model is trained using a supervised machine learning technique.

13. The method of claim 12, further comprising:
    generating execution latency data of first commands;
    identify, from the latency data, second commands causing more than a threshold amount of increase in execution latency of at least one of the first commands; and
    training the predictive model using the supervised machine learning technique to reduce differences between the second commands identified using the latency data and third commands identified by the predictive model from the first commands.

14. The method of claim 13, further comprising:
    computing averages of execution latency of different types of commands; and
    comparing execution latency of the first commands to the averages to identify the at least one of the first commands that has more than the threshold amount of increase in execution latency.

15. The method of claim 14, further comprising:
    identifying the second commands in response to a determination that the second commands have a predetermined characteristic and that the second commands have been executed concurrently with the at least one of the first commands.

16. The method of claim 15, wherein the predetermined characteristic includes a predetermined command type, a predetermined command category, or an average execution latency being above a threshold, or any combination thereof.

17. The method of claim 12, further comprising:
    spreading latency impact of the command over more than a threshold number of commands.

18. The method of claim 12, further comprising:
    retrieving the portion of data from the non-volatile memory and storing the portion of data in the buffer memory during execution of a plurality of commands, using resources that are not used for the execution of the plurality of commands.

19. A non-transitory computer storage medium storing instructions which, when executed by a computing system, cause the computing system to perform a method, the method comprising:
    receiving latency data of first commands executed in a data storage system;
    identify, from the latency data, second commands causing more than a threshold amount of increase in execution latency of at least one of the first commands; and
    training a predictive model using the supervised machine learning technique to reduce differences between the second commands identified using the latency data and third commands identified by the predictive model from the first commands.

20. The non-transitory computer storage medium of claim 19, storing further instructions which, when executed by a computing system, cause the computing system to perform the method, the method further comprising:

receiving, in a controller of a data storage system, pending commands from a host system for execution in the data storage system;
providing, to the predictive model, the pending commands as input;
identifying, using the predictive model and based on the pending commands as input, at least one fifth command for pre-fetching; and
prior to the fifth command being executed in the data storage device,
   retrieving, from non-volatile memory of the data storage media, at least a portion of data to be used in execution of the fifth command; and
   storing the portion of data in buffer memory of the data storage system.

* * * * *